US012578198B2

(12) United States Patent
Abdulsaid et al.

(10) Patent No.: US 12,578,198 B2
(45) Date of Patent: Mar. 17, 2026

(54) INTELLIGENT ROUTE DETERMINATION AND ELECTRIC VEHICLE RANGE PREDICTION

(71) Applicant: FCA US LLC, Auburn Hill, MI (US)

(72) Inventors: Ali Abdulsaid, Northville, MI (US); Mark D Cesamer, Royal Oak, MI (US); Katherine K Morrow-Abraham, East China, MI (US); Vanessa K Vitso, Ypsilanti, MI (US)

(73) Assignee: FCA US LLC, Auburn Hills, MI (US)

( * ) Notice: Subject to any disclaimer, the term of this patent is extended or adjusted under 35 U.S.C. 154(b) by 144 days.

(21) Appl. No.: 18/526,171

(22) Filed: Dec. 1, 2023

(65) Prior Publication Data

US 2025/0180368 A1 Jun. 5, 2025

(51) Int. Cl.
| | |
|---|---|
| *G01C 21/34* | (2006.01) |
| *B60L 1/00* | (2006.01) |
| *B60L 7/10* | (2006.01) |
| *B60L 58/12* | (2019.01) |
| *B60L 58/24* | (2019.01) |
| *G07C 5/00* | (2006.01) |

(52) U.S. Cl.
CPC .......... *G01C 21/3469* (2013.01); *B60L 1/003* (2013.01); *B60L 7/10* (2013.01); *B60L 58/12* (2019.02); *B60L 58/24* (2019.02); *G07C 5/004* (2013.01); *B60L 2240/64* (2013.01); *B60L 2240/66* (2013.01); *B60L 2240/68* (2013.01); *B60L 2250/16* (2013.01)

(58) Field of Classification Search
CPC ....... G01C 21/3469; B60L 1/003; B60L 7/10; B60L 58/12; B60L 58/24; B60L 2240/64; B60L 2240/66; B60L 2240/68; B60L 2250/16; G07C 5/004
See application file for complete search history.

(56) References Cited

U.S. PATENT DOCUMENTS

| | | | | |
|---|---|---|---|---|
| 8,583,304 B2 * | 11/2013 | Uyeki | ..................... | B60L 53/65 701/123 |
| 2020/0047629 A1 * | 2/2020 | Cho | .................... | B60L 15/2045 |
| 2021/0231450 A1 * | 7/2021 | Pedersen | .............. | G05D 1/0285 |
| 2022/0282981 A1 * | 9/2022 | Song | .................. | G01C 21/3476 |

* cited by examiner

*Primary Examiner* — Bao Long T Nguyen
(74) *Attorney, Agent, or Firm* — Jeremy J. Klobucar

(57) ABSTRACT

A route optimization system for a battery electric vehicle (BEV) includes a controller programmed to perform the following operations. Determine a navigational route to a destination. Determine a predicted intelligent energy consumption of the BEV based on a set of vehicle operating conditions. Determine a trip estimated energy consumption based on the navigational route and the predicted intelligent energy consumption. If the trip estimated energy consumption is greater than a remaining energy in the high voltage battery, determine an electric vehicle supply equipment (EVSE) charging location along the navigational route. Determine an updated trip estimated energy consumption that accounts for addition of the EVSE charging location to the navigational route. Propose, to the user, an updated navigational route including the EVSE charging location if the remaining energy in the high voltage battery is sufficient to account for the addition of the EVSE charging location to the navigational route.

18 Claims, 8 Drawing Sheets

INTELLIGENT ROUTE DETERMINATION AND ELECTRIC VEHICLE RANGE PREDICTION

FIELD

The present application generally relates to electric vehicles (EVs) and, more particularly, to EV route determination systems to reduce range anxiety and provide viable route charging solutions.

BACKGROUND

Range anxiety is one of the major obstacles to the commercialization of electrified vehicles and, more particularly, battery electric vehicles (BEVs). This so-called range anxiety is due to BEVs only having one or more electric motors and a high voltage energy storage (e.g., battery) system for propulsion and not having a conventional fuel-powered internal combustion engine. With limited options and locations for battery recharging, and only simple algorithms to estimate vehicle range, drivers can potentially become stranded if they exceed the usable range of the vehicle. Accordingly, while these conventional systems do work for their intended purpose, there exists an opportunity for improvement in the relevant art.

SUMMARY

According to one example aspect of the invention, a route optimization system for a battery electric vehicle (BEV) having a high voltage battery is provided. In one exemplary implementation, the system includes a user interface configured to display information and to receive user input for a route selection of the BEV. A controller is programmed to perform the following operations. Receive, by a user via the user interface, a destination of travel for the BEV. Determine a navigational route to the destination of travel. Evaluate a set of vehicle operating conditions. Determine a predicted intelligent energy consumption of the BEV based on the set of vehicle operating conditions. Determine a trip estimated energy consumption based on the navigational route and the predicted intelligent energy consumption. If the trip estimated energy consumption is greater than a remaining energy in the high voltage battery, determine an electric vehicle supply equipment (EVSE) charging location along the navigational route. Determine an updated trip estimated energy consumption that accounts for addition of the EVSE charging location to the navigational route. And propose, to the user, an updated navigational route including the EVSE charging location if the remaining energy in the high voltage battery is sufficient to account for the addition of the EVSE charging location to the navigational route.

In addition to the foregoing, the described system may include one or more of the following features: wherein determining the predicted intelligent energy consumption includes determining a first vehicle range impact based on (i) an electric drive motor (EDM) power consumption input, (ii) a battery management system (BMS) state of charge (SOC) input, power consumption input, and high voltage battery energy level input, (iii) a thermal management system thermal state input and thermal power consumption input, (iv) an HVAC system power consumption input, and (v) an accessory power module (APM) power consumption input.

In addition to the foregoing, the described system may include one or more of the following features: wherein determining the predicted intelligent energy consumption further includes determining a second vehicle range impact based on (i) a driver selected regenerative braking mode input, (ii) a driver selected e-coast mode input, and (iii) a driver selected drive mode input; wherein determining the predicted intelligent energy consumption further includes determining a third vehicle range impact based on (i) an occupant restraint controller (ORC) occupancy sensing input and cargo sensing input, and (ii) a trailer sensing input; wherein determining the predicted intelligent energy consumption further includes determining a fourth vehicle range impact based on (i) a tire pressure input and (ii) a window state input indicating if a window is open or closed; and wherein determining the predicted intelligent energy consumption further includes determining a fifth vehicle range impact based on (i) an elevation of the BEV vehicle input, (ii) a terrain input, (iii) a weather conditions input, and (iv) a traffic input.

In addition to the foregoing, the described system may include one or more of the following features: wherein the set of vehicle operating conditions includes the following inputs: (a) a current state of charge (SOC) of the high voltage battery, (b) a current power consumption of the high voltage battery, (c) a remaining energy of the high voltage battery, (d) a thermal management system status and power consumption, (e) an OBD system operation, (f) a trailer status, (g) a vehicle load/cargo weight estimation, (h) a vehicle occupancy status, (i) a tire pressure, (j) a distance to the destination of travel, (k) a time to the destination of travel, (l) speed limits along the navigational route, (m) traffic information along the navigational route, (n) EVSE location, (o) EVSE power type, (p) EVSE operational availability, (q) EVSE plug-type, (r) a maximum high voltage battery charge selection, (s) weather conditions, (t) selected vehicle drive mode, (u) selected regenerative braking mode, (v) selected e-coast mode, (w) vehicle speed, (x) a vehicle historic energy usage from memory, and (y) an individual driver habits profile.

In addition to the foregoing, the described system may include one or more of the following features: wherein determining the predicted intelligent energy consumption includes determining a nominal predicted intelligent energy consumption, and determining an actual predicted intelligent energy consumption; wherein the controller is further programmed to compare the actual and nominal predicted intelligent energy consumption, and if the actual predicted intelligent energy consumption is higher than the nominal predicted intelligent energy consumption, inform the user of a higher than expected energy consumption, thereby indicating an issue with the vehicle and/or user driving habits; and wherein the controller is further programmed to determine a simple rolling average energy consumption, determine if the predicted intelligent energy consumption is within a predetermined threshold of the simple rolling average energy consumption, if within the predetermined threshold, determine the trip estimated energy consumption based on the navigational route and the simple rolling average energy consumption, and if outside the predetermined threshold, determine the trip estimated energy consumption based on the navigational route and the predicted intelligent energy consumption.

In accordance with another example aspect of the invention, a route optimization method for a battery electric vehicle (BEV) having a high voltage battery is provided. In one example implementation, the method includes receiving, by a controller and a user interface, a destination of travel for the BEV; determining, by the controller, a navigational route to the destination of travel; evaluating, by the controller, a set of vehicle operating conditions; determining, by the controller, a predicted intelligent energy consumption of the BEV based on the set of vehicle operating conditions; determining, by the controller, a trip estimated energy consumption based on the navigational route and the predicted intelligent energy consumption; if the trip estimated energy consumption is greater than a remaining energy in the high voltage battery, determining by the controller, an electric vehicle supply equipment (EVSE) charging location along the navigational route; determining, by the controller, an updated trip estimated energy consumption that accounts for addition of the EVSE charging location to the navigational route; and proposing to the user, by the controller, an updated navigational route including the EVSE charging location if the remaining energy in the high voltage battery is sufficient to account for the addition of the EVSE charging location to the navigational route.

In addition to the foregoing, the described method may include one or more of the following features: wherein determining the predicted intelligent energy consumption includes determining, by the controller, a first vehicle range impact based on (i) an electric drive motor (EDM) power consumption input, (ii) a battery management system (BMS) state of charge (SOC) input, power consumption input, and high voltage battery energy level input, (iii) a thermal management system thermal state input and thermal power consumption input, (iv) an HVAC system power consumption input, and (v) an accessory power module (APM) power consumption input.

In addition to the foregoing, the described method may include one or more of the following features: wherein determining the predicted intelligent energy consumption further includes determining, by the controller, a second vehicle range impact based on: (i) a driver selected regenerative braking mode input, (ii) a driver selected e-coast mode input, and (iii) a driver selected drive mode input; wherein determining the predicted intelligent energy consumption further includes determining, by the controller, a third vehicle range impact based on (i) an occupant restraint controller (ORC) occupancy sensing input and cargo sensing input and (ii) a trailer sensing input; wherein determining the predicted intelligent energy consumption further includes determining a fourth vehicle range impact based on (i) a tire pressure input and (ii) a window state input indicating if a window is open or closed; and wherein determining the predicted intelligent energy consumption further includes determining, by the controller, a fifth vehicle range impact based on (i) an elevation of the BEV vehicle input, (ii) a terrain input, (iii) a weather conditions input, and (iv) a traffic input.

In addition to the foregoing, the described method may include one or more of the following features: wherein the set of vehicle operating conditions includes the following inputs: (a) a current state of charge (SOC) of the high voltage battery, (b) a current power consumption of the high voltage battery, (c) a remaining energy of the high voltage battery, (d) a thermal management system status and power consumption, (e) an OBD system operation, (f) a trailer status, (g) a vehicle load/cargo weight estimation, (h) a vehicle occupancy status, (i) a tire pressure, (j) a distance to the destination of travel, (k) a time to the destination of travel, (l) speed limits along the navigational route, (m) traffic information along the navigational route, (n) EVSE location, (o) EVSE power type, (p) EVSE operational availability, (q) EVSE plug-type, (r) a maximum high voltage battery charge selection, (s) weather conditions, (t) selected vehicle drive mode, (u) selected regenerative braking mode, (v) selected e-coast mode, (w) vehicle speed, (x) a vehicle historic energy usage from memory, and (y) an individual driver habits profile.

In addition to the foregoing, the described method may include one or more of the following features: wherein determining the predicted intelligent energy consumption includes determining, by the controller, a nominal predicted intelligent energy consumption, and determining, by the controller, an actual predicted intelligent energy consumption; comparing, by the controller, the actual and nominal predicted intelligent energy consumption, and if the actual predicted intelligent energy consumption is higher than the nominal predicted intelligent energy consumption, informing the user, by the controller, of a higher than expected energy consumption, thereby indicating an issue with the vehicle and/or user driving habits; determining, by the controller, a simple rolling average energy consumption; determining, by the controller, if the predicted intelligent energy consumption is within a predetermined threshold of the simple rolling average energy consumption; if within the predetermined threshold, determining by the controller, the trip estimated energy consumption based on the navigational route and the simple rolling average energy consumption; and if outside the predetermined threshold, determining by the controller, the trip estimated energy consumption based on the navigational route and the predicted intelligent energy consumption.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figure 1:
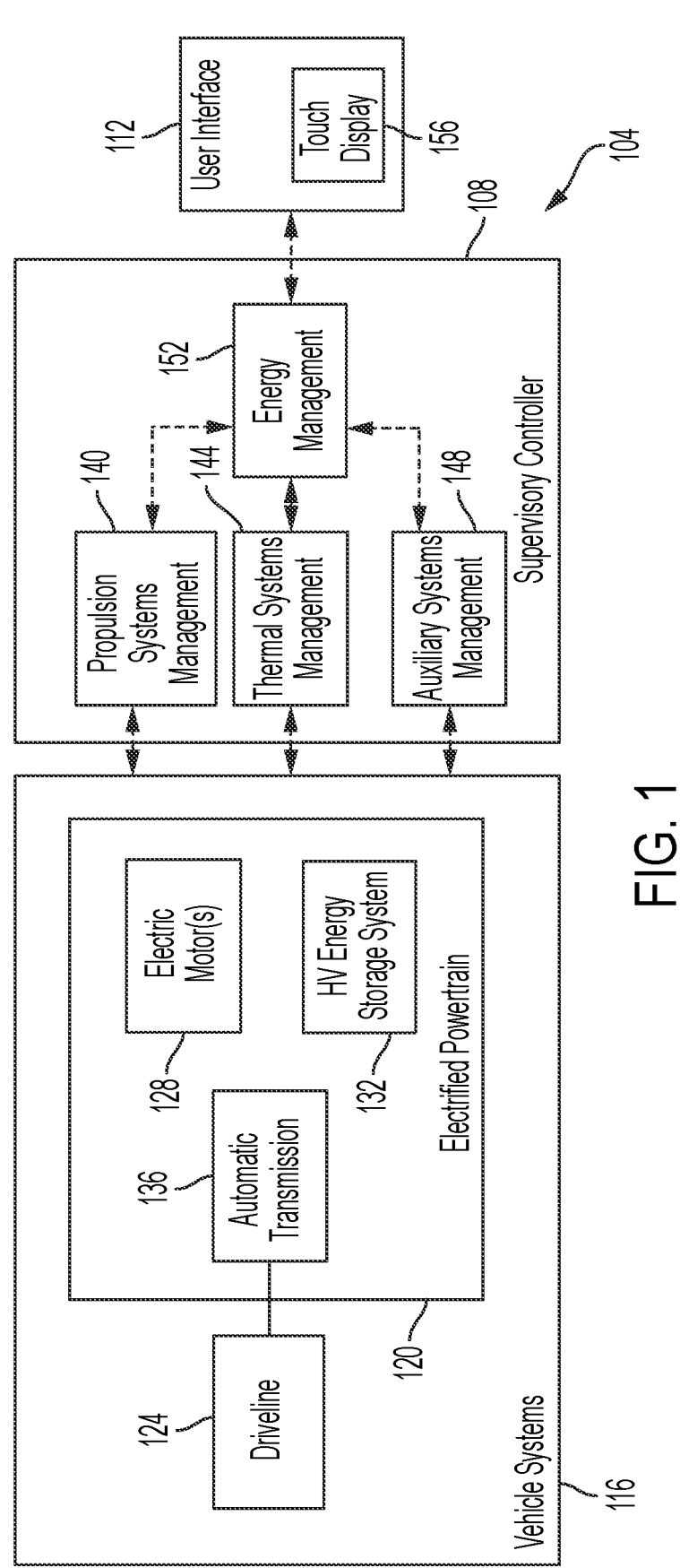
FIG. 1 is a functional block diagram of an example battery electric vehicle (BEV) having a route optimization system according to the principles of the present application.

As previously discussed, battery electric vehicle (BEV) drivers face a range anxiety challenge when traveling to their destinations due to limited options and locations for recharging. With current vehicles utilizing only simple algorithms to estimate vehicle range, drivers can become stranded if they exceed the usable range of the vehicle. Accordingly, improved route optimization systems for an electric vehicle are provided to reduce range anxiety and provide the driver with a viable charging solution on the way to their destination.

In one example, the route optimization system receives a plurality of inputs related to the vehicle status, conditions, driving behavior, etc. Using the collected information, the system calculates a simple rolling average energy consumption and compares it to both a nominal and an actual predicted intelligent energy consumption. If the predicted energy consumption deviates significantly from the rolling average, the system utilizes a complex prediction for displaying the remaining vehicle range and analyzing battery energy usage along a navigational route. If the actual predicted intelligent energy consumption is less than a nominal predicated intelligent energy consumption, the driver will be informed that actual predicted consumption is higher than nominal predicted consumption, and that there may be an issue with their vehicle or driving habits.

As navigation to a route is requested, the system is configured to evaluate routes based on distance, time to destination, and any other applicable driver selection(s). Using the energy consumption algorithm and remaining vehicle range, the total trip estimated energy consumption is calculated. If the estimated energy consumption is greater than the remaining high voltage battery energy, the system evaluates electric vehicle supplemental equipment (EVSE) charger options along the route based on distance, time, and other driver selection(s).

If the remaining high voltage battery energy is not sufficient to offset energy consumption during added travel to/from the EVSE, to meet vehicle battery thermal conditioning requirements, or to travel the remainder of the route, the system is configured to propose multiple EVSE stops before the final destination. Additional distance, travel time, and estimated charge time will be displayed to the driver and included in the route total distance/duration. The vehicle's battery temperature, state of charge (SOC), and charging profile are compared to EVSE power available to determine the added trip time from recharging the high voltage battery. If the driver does not approve of the proposed route or EVSE options, the system is configured to propose alternate paths to the selected destination.

As the vehicle proceeds along the route, the system is configured to utilize live inputs and real-time energy consumption to continuously re-evaluate and propose routes to prevent the vehicle from becoming stranded. Energy consumption, vehicle, and driver data collected on each trip are stored to historic memory and reference in future trips. For each driver, the system can store and reference historical information such as throttle and braking aggression, following speed limits, use of cruise control or smooth driving, excessive idle time, drive mode and regen level settings, and HVAC settings.

The system can be paired with other technical solutions such as suggested speed, adaptive cruise control, autonomous driving, braking energy regeneration, and intelligent e-coasting to further optimize the vehicle range and reduce trip energy consumption. Through the vehicle's HMI, the system is configured to continuously display the route and directions, comprehensive vehicle information, and predictions for range, SOC, and time along the route. Further, the driver may be instructed on their driving habits, be made aware when they are exceeding standard predicted values for energy consumption, and receive tips on how to improve range.

The system described herein is unlike conventional systems which are limited to simply broadcasting the available range the vehicle can support and providing a route based on driver preferences such as shortest route, fastest route, no tolls, etc. Such conventional systems are not fully intelligent in considering the full spectrum of conditions that may impact the range of an electric vehicle. These systems are susceptible to sudden changes in the route type or conditions such as city to highway or changing weather conditions. Current systems make assumptions that their SOC can be sufficient in transporting them the full route distance, but do not intelligently reevaluate those assumptions along the route. Moreover, these current systems do not accurately consider environmental and terrain conditions, the battery SOC, EVSE availability, and power ratings along the path, charge times, loaded vehicle or trailer weight, vehicle condition, or historic energy usage based on vehicle data and driving style.

As such, the route optimization system described herein improves results in range estimation and route planning by utilizing live and historic data tailored to an individual vehicle. The system utilizes the predicted range available based on the location the targeted destination to provide an effective path where charging sessions can be utilized. Accordingly, the system increases driver confidence along the drive based on real time data from the vehicle and GPS system, cell towers, or other modern methods of live data transfer. With live current data, the route can be planned effectively and efficiently to guide the customer and provide information on charging stations along the path if one must stop to recharge.

Referring now to FIG. 1, a functional block diagram of an example BEV 100 having a route optimization system 104 according to the principles of the present application is presented. The term "BEV" as used herein refers to electrified vehicles (EVs) limited to all-electric operation and without a backup/secondary traditional fuel source (gasoline, diesel, etc.). The route optimization system 104 generally includes a supervisory controller 108 of the BEV 100 and a user interface 112 of the BEV 100. The BEV 100 further includes vehicle systems 116 comprising an electrified powertrain 120 configured to generate and transfer drive torque to a driveline 124. The electrified powertrain 120 includes one or more electric motors 128 powered via a high voltage energy system 132 (e.g., a high voltage battery system) to generate torque and an automatic transmission 136 configured to transfer the torque to the driveline 124. The vehicle systems 116 further include one or more thermal systems (not specifically shown) and one or more auxiliary systems (not specifically shown).

The thermal systems include, for example, systems configured to thermally manage or condition specific environments of the BEV 100, such as a cabin of the BEV 100, the high voltage energy system 132, the automatic transmission 136, other power electronics, and the like. The auxiliary systems include, for example, a plurality of auxiliary loads (e.g., low voltage auxiliary loads, such as 12 Volt (V) auxiliary loads including an infotainment system, pumps, fans, lamps, and the like). One primary control function of the supervisory controller 108 is to control the propulsion systems (e.g., electrified powertrain 120) to satisfy a torque request, which could be provided by a user (e.g., a driver) of the BEV 100 via the user interface 112 (e.g., an accelerator pedal). The supervisory controller 108 is also configured to perform at least a portion of the route optimization techniques of the present disclosure via a propulsion systems management 140, a thermal systems management 144, an auxiliary systems management 148, and an energy management 152. This includes receiving various system/data inputs, including user (e.g., driver) interaction with the user interface 112 (e.g., a touch display 156).

Figure 2A:
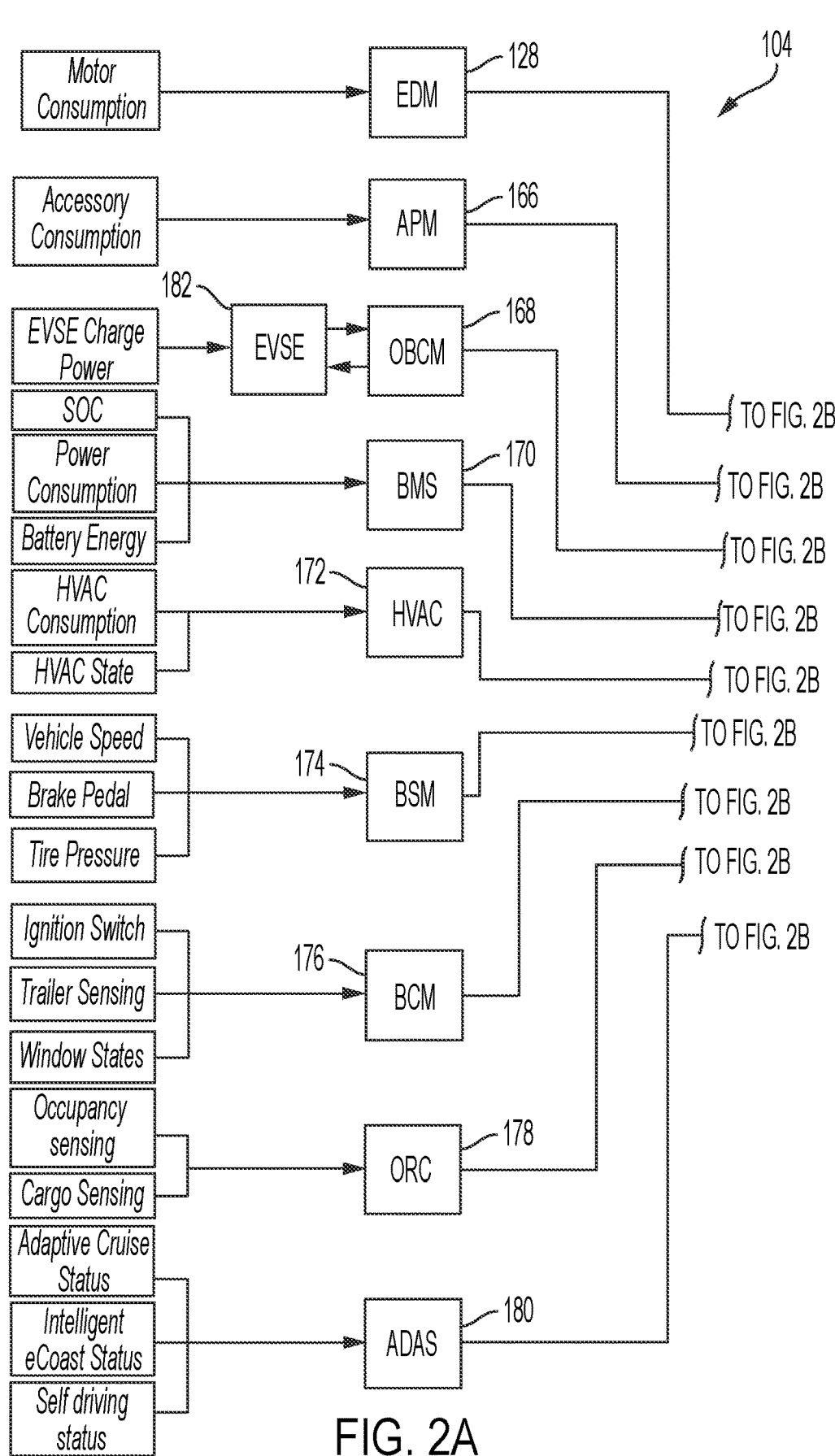
FIGS. 2A-2B illustrate a functional block diagram of an example route optimization system of FIG. 1, according to the principles of the present application.
Figure 2B:
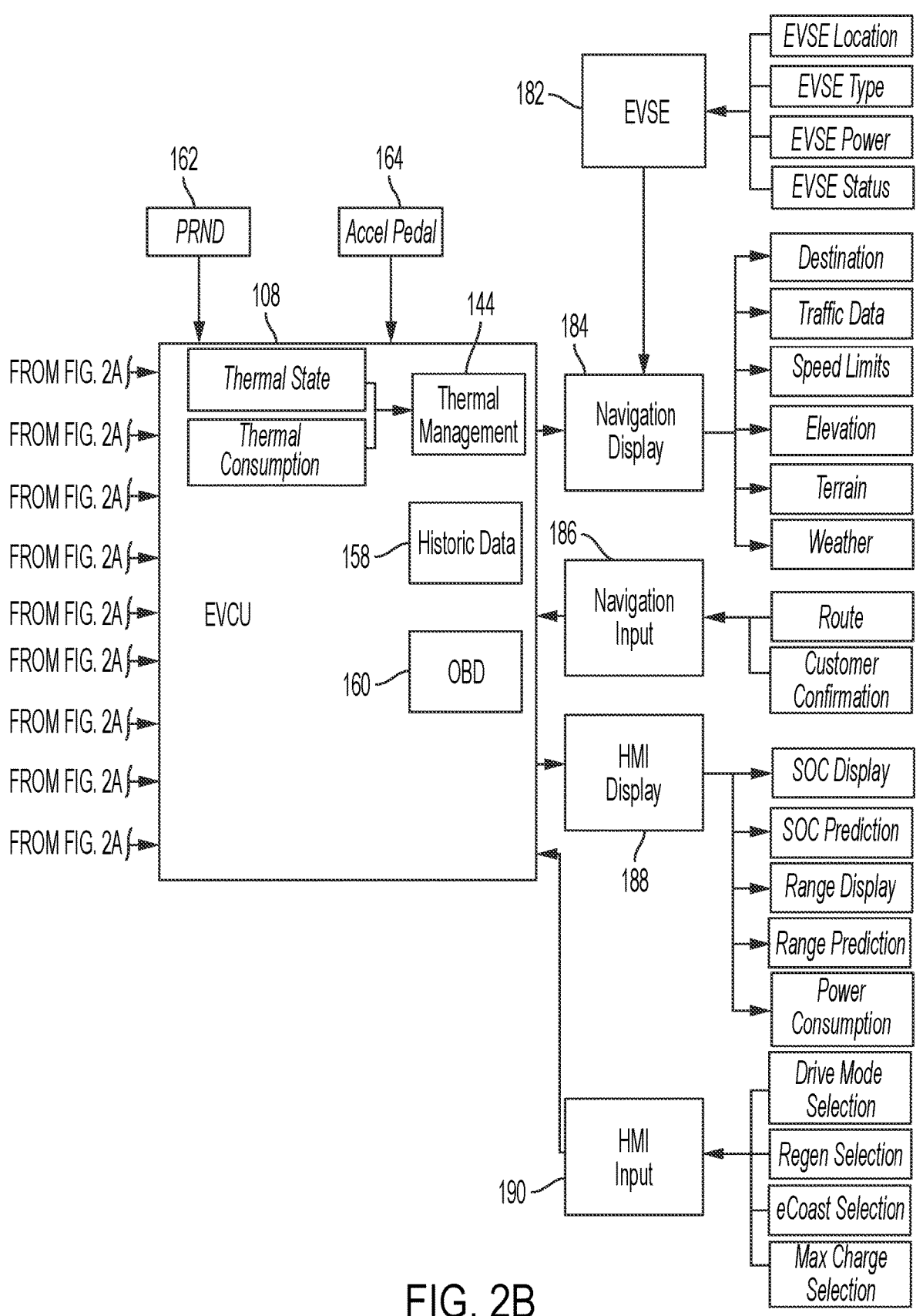
Figure 3A:
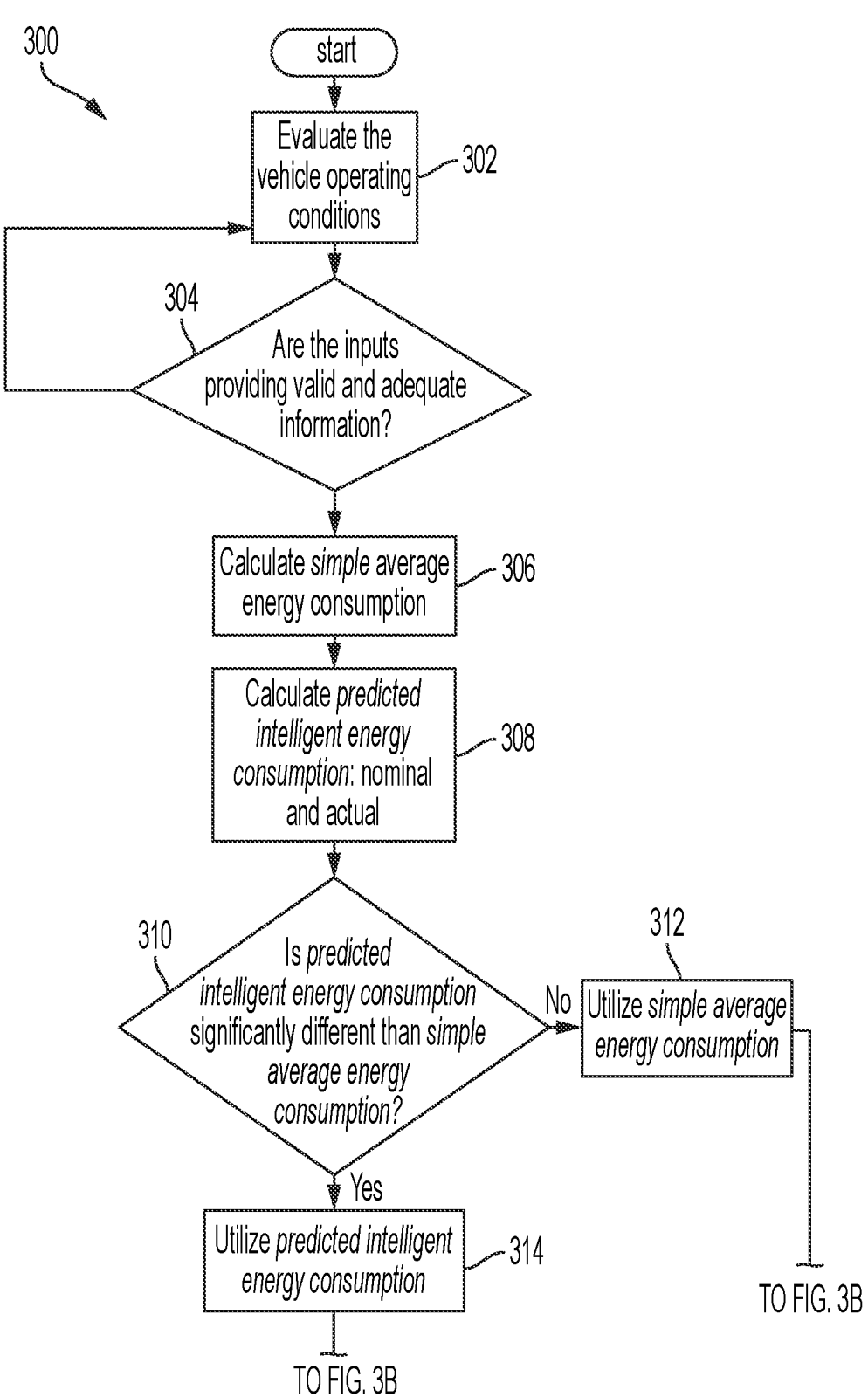
FIGS. 3A-3D illustrate a flow diagram of an example route optimization method for a BEV according to the principles of the present application.
Figure 3B:
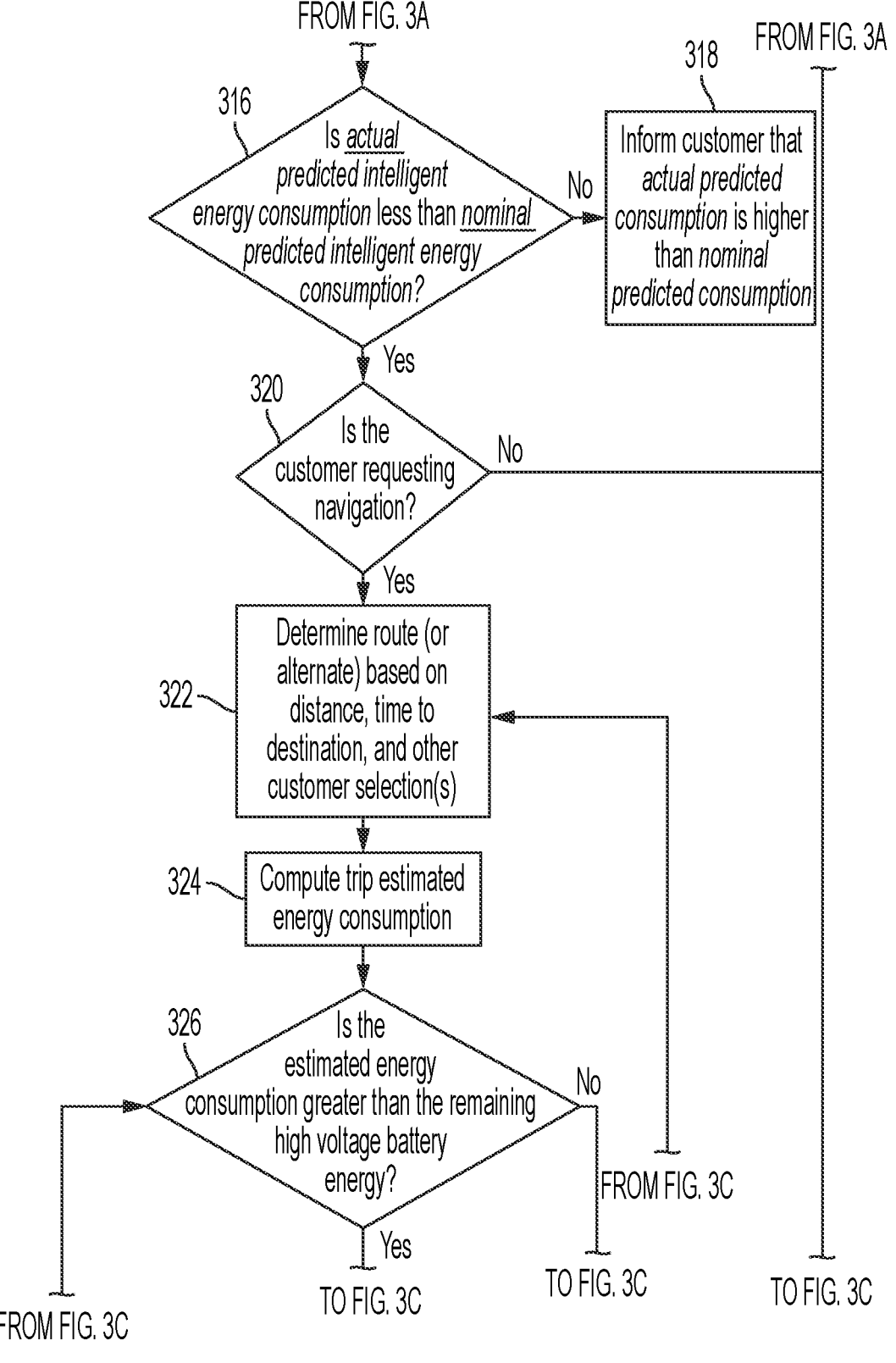
Figure 3C:
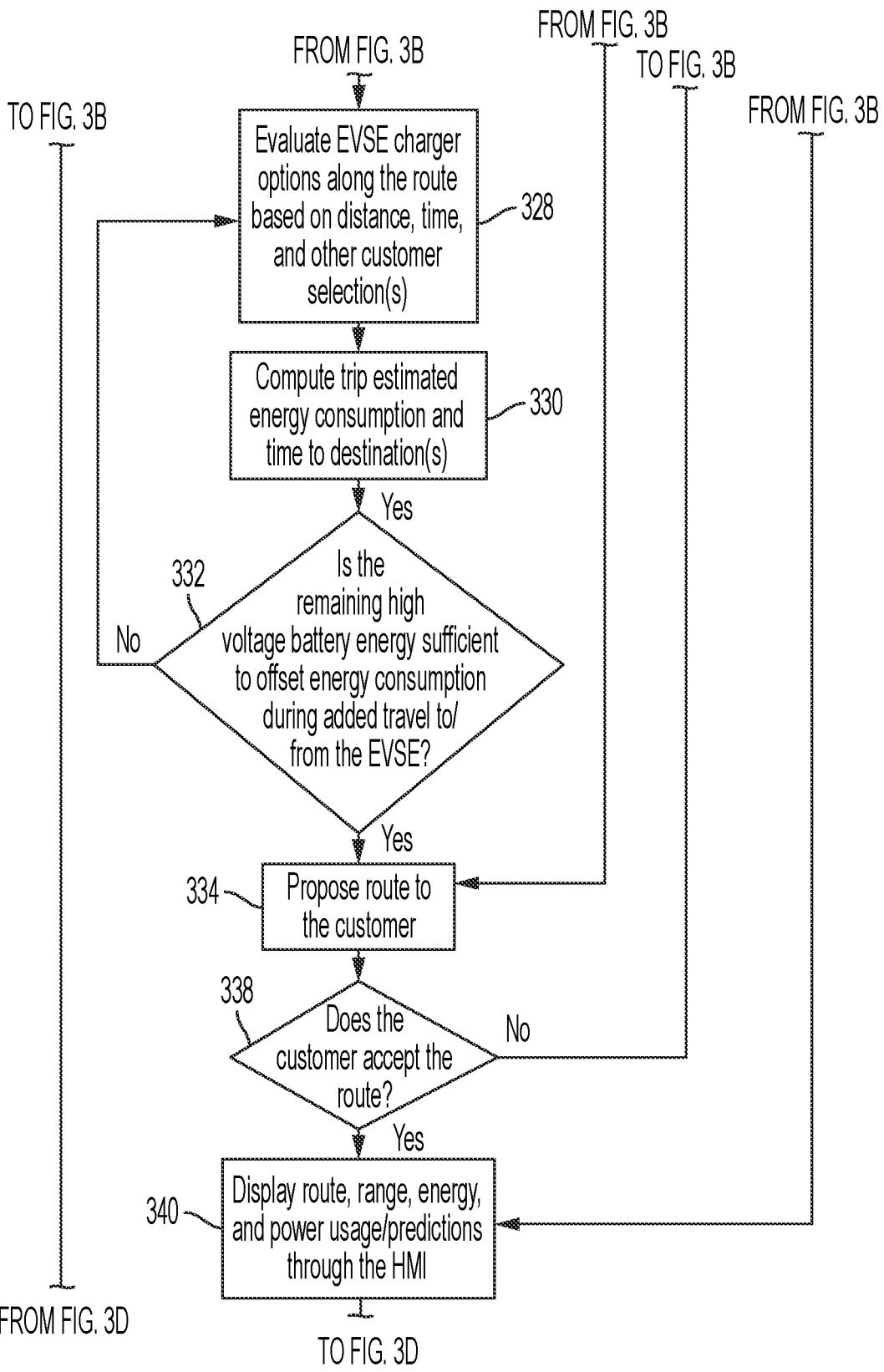
Figure 3D:
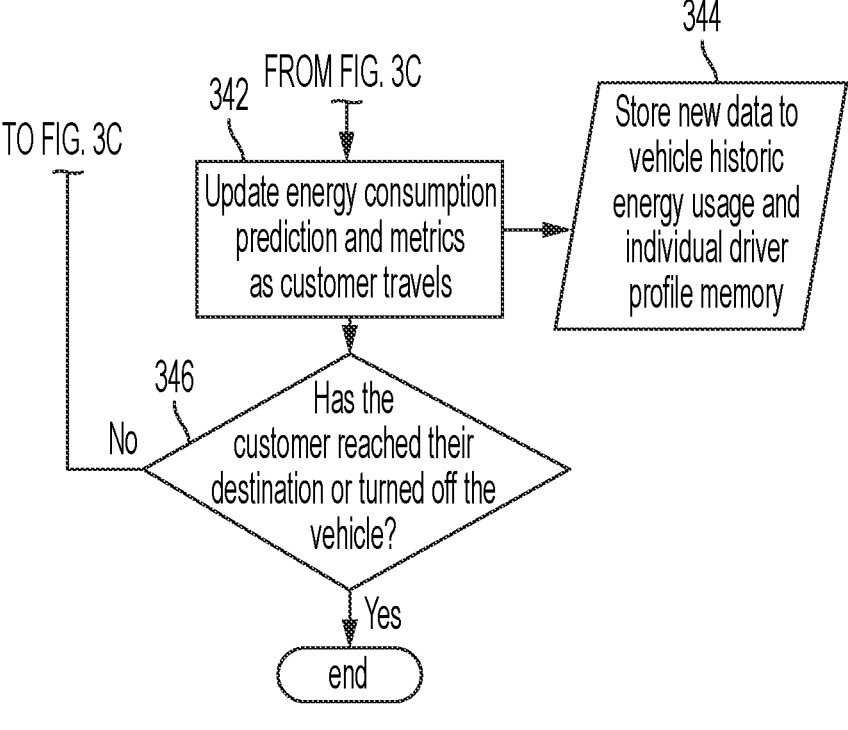

With reference now to FIGS. 2A-2B, an example architecture of the route optimization system 104 according to the principles of the present application is presented. As shown, the route optimization system 104 includes the supervisory controller 108, which is in signal communication with and is configured to coordinate interaction between powertrain modules, sensors, and other electrical and electronic modules or components. In the example embodiment, the supervisory controller 108 includes or is in signal communication with the thermal management system 144, historic data 158, and on-board diagnostics (OBD) 160 (see FIG. 2B).

The thermal management system 144 is configured to receive input regarding a thermal state and a thermal consumption of the BEV 100. The historic data 158 includes, for example, historical drive cycle data (e.g., vehicle loading, energy consumption per mile, etc.) of the driver for energy consumption calculation within the supervisory controller 108. The OBD 160 is configured for measurement and reporting of vehicle sensor data and vehicle fault codes for actionable repair items. Additionally, the supervisory controller is configured to receive input from a gear selector 162 and an accelerator pedal 164.

As shown in FIG. 2A, the supervisory controller 108 is also in signal communication with and configured to receive input from the electric drive motor(s) (EDM) 128, an accessory power module (APM) 166, an on-board charging module (OBCM) 168, a battery management system (BMS) 170, an HVAC module 172, a brake system module (BSM) 174, a body control module (BCM) 176, an occupant restraint controller (ORC) 178, and an advanced driver assistance system (ADAS) 180.

The EDM 128 is configured to convert electrical energy from the HV battery 132 into the mechanical energy required for vehicle movement. The EDM 128 is configured to provide input signals indicating a power consumption of the electric motor. The APM 166 is configured to convert HV battery power into low voltage power (e.g., 12V) for on-board computers and other accessory body components. The APM 166 is configured to provide input signals indicating a power consumption of the vehicle accessories. The OBCM 168 is a HV charging module configured to communicate between an EVSE 182 and the supervisory controller 108 to provide AC charging power into the HV battery 132. The EVSE 182 is an AC and/or DC charging unit configured to convert wall/grid power into usable energy for charging the BEV 100. The OBCM 168 is configured to provide input signals indicating an EVSE charge power.

The BMS 170 is configured to manage physical and electrical components of the HV battery 132. The BMS 170 is configured to provide input signals indicating SOC, power consumption, and battery energy of the HV battery 132. The HVAC module 172 is an interface for cabin climate setting selection and climate temperature targets. The HVAC module 172 is configured to provide input signals indicating HVAC power consumption and HVAC system state (e.g., heating, cooling, etc.). The BSM 174 interfaces with the brake pedal, braking components, and wheel speeds (not shown) to determine vehicle speed and control regenerative and friction braking. The BSM 174 is configured to receive input signals indicating vehicle speed, brake pedal actuation, and tire pressure.

The BCM 176 interfaces with vehicle body components such as, for example, ignition state, doors, windows, and lights. The BCM 176 is configured to receive input signals indicating ignition switch state, trailer sensing, and windows state. The ORC 178 interfaces with vehicle seatbelts and seat weight sensors (not shown). The ORC 178 is configured to receive input signals indicating occupant sensing and cargo sensing. The ADAS 180 includes partially or fully autonomous driver aid systems such as, for example, adaptive cruise control, autonomous driving, and intelligent e-coasting.

With continued reference to FIG. 2B, the supervisory controller 108 is also configured to provide input to and/or receive input from EVSE 182, a navigation display 184 and navigation input 186 (e.g., as part of user interface 112), and a human machine interface (HMI) display 188 and HMI input 190 (e.g., as part of the user interface 112 and touch display 156).

The navigation display 184 and navigation input 186 may be part of or associated with a GPS/maps system, which could include a global navigation satellite system (GNSS) transceiver (not shown) configured to determine a precise geo-location of the BEV 100 (e.g., precise coordinates of the BEV 100). The GPS/maps system could also be configured to determine and localize the position of the BEV 100 relative to a map, such as a high-definition (HD) map. Map data could be stored remotely (e.g., at a remote server), locally (e.g., at the controller 108), or some combination thereof. The map data includes, among other things, a plurality of road segments each having varying road attributes (length, speed limit, curvature, elevation, grade, etc.). A navigational route for the BEV 100 could include a plurality of these road segments from a start point to a desired end point. This route could be user-specified (e.g., via a driver input) or based on historical data/patterns, such as when/where the driver normally drives the BEV 100.

The EVSE 182 is configured to provide the navigation display 184 with input signals indicating an EVSE location, EVSE type (e.g., plug type), EVSE power rating (e.g., fast charging), and EVSE status (e.g., operable/inoperable). This information may be displayed to the user, for example, on touchscreen display 156. The navigation display 184 is configured to receive input signals from supervisory controller 108 indicating a destination, traffic data, speed limits, elevation, terrain, and weather conditions. This information may be displayed to the user, for example, on touchscreen display 156. Navigation input 186 is configured to provide input signals indicating a selected route as well as user confirmation.

The HMI display 188 is a user interface such as the instrument cluster, radio, or other visual/touch interfaces. The HMI display 188 is configured to receive input signals from supervisory controller 108 indicating an SOC display, an SOC prediction, a vehicle range display, a vehicle range prediction, and a vehicle power consumption. The HMI input 190 is configured to provide input signals indicating a drive mode selection (e.g., sport, eco, etc.), regen selection (e.g., regenerative braking active), e-coast selection (e.g., e-coast on/off), and a maximum charge selection (e.g., 70%, 90%, 100%).

Referring now to FIGS. 3A-3D, a flow diagram of an example route optimization method 300 for a BEV according to the principles of the present application is illustrated. While the BEV 100 and the components of FIGS. 1-2 are specifically referenced for illustrative/descriptive purposes, it will be appreciated that the method 300 could be applicable to any suitably configured BEV. The method 300 begins at step 302 where supervisory controller 108 ("control") evaluates a pre-selected set of operating conditions of BEV 100 based on input from the various systems/components described in FIGS. 1-2.

At step 304, control determines if one or more inputs are providing valid and adequate information. For example, control determines if one or more of the following are valid/adequate: current SOC (BMS 170), current power consumption (BMS 170), remaining HV battery energy (BMS 170), HVAC status and consumption (HVAC 172), thermal management status and consumption (144), accessory power consumption (APM 166), OBD and systems operation (OBD 160), trailer status (BCM 176), load/cargo weight estimation (ORC 178), seatbelt/occupancy status (ORC 178), tire pressures (BSM 174), distance to destination(s) (Nav 184, 186), time to destination(s) (Nav 184, 186), speed limits along route (Nav 184), traffic information (Nav 184), elevation change/road grade along route (Nav 184), EVSE power available (EVSE 182), EVSE operational/in-use (EVSE 182), EVSE plug type (EVSE 182), maximum battery charge selection (HMI 190), weather conditions (Nav 184), drive mode(s) (HMI 190), regen/e-coast mode(s) (HMI 190), vehicle speed (BSM 174), vehicle historic energy usage from memory (historic data 158), and individual driver habits profile from memory (historic data 158/).

If the inputs are not providing valid/adequate information, control returns to step 302. If yes, control proceeds to step 306 and supervisory controller 108 determines a simple rolling average energy consumption. In one example, this is determined by monitoring energy consumption per mile and reevaluating the overall available energy within the propulsion system/HV battery. At step 308, control determines a predicted intelligent energy consumption, nominal and actual. In one example, the nominal consumption is a simulated/pre-calibrated or predicted value, and the actual consumption is the actual value that occurs during the drive cycle. This determination is provided in detail in FIG. 4. At step 310, control determines if the predicted intelligent energy consumption is significantly different than the simple rolling average energy consumption (e.g., outside a predetermined range/threshold). If no, at step 312, control selects the simple rolling average energy consumption and proceeds to step 340. If yes, control proceeds to step 314.

At step 314, control selects the predicted intelligent energy consumption. At step 316, control determines if the actual predicted intelligent energy consumption is less than the nominal predicted intelligent energy consumption. If no, at step 318, control informs the user that actual predicted intelligent energy consumption is higher than nominal predicted intelligent energy consumption. In one example, this indicates there is an issue with the vehicle and/or driving habits causing a higher than expected energy consumption. At this point, control may provide the driver with recommendations on their driving habits or variable conditions that the driver may influence, such as speed, reducing accessory loads, limiting use of the climate controls, inflating the tires, closing windows, etc. The system will further store historic energy consumption trends and adjust the prediction if the vehicle consistently achieves an energy consumption deviated from what was predicted. If yes, control proceeds to step 320.

At step 320, control determines if the user is requesting navigation, for example, via navigation input 186. If no, control proceeds to step 340. If yes, at step 322, control determines a navigational route (or alternate route) based on distance, time to destination, and other user selections (e.g., eco-route, fastest route, avoid tolls, avoid terrains, etc.). At step 324, control determines a trip estimated energy consumption. In one example, control looks at the full vehicle and powertrain state and external factors, such as ambient temperature, road load, weather conditions, tire pressures (impact rolling resistance), HV battery SOC, powertrain energy consumption, and subsequently determines how much HV battery energy is required to drive the route.

At step 326, control determines if the trip estimated energy consumption is greater than the remaining HV battery energy. If no, control proceeds to step 334. If yes, at step 328, control evaluates all EVSE charger options along the route based on distance, time to EVSE, and other user selections. At step 330, control determines an updated trip estimated energy consumption and time to destination(s) for each EVSE charger option to account for the route deviation and additional energy consumption thereof. At step 332, control determines if the remaining HV battery energy is sufficient to allow/account for the additional energy consumption during the added travel to/from the EVSE charger location. If no, control returns to step 328. If yes, control proceeds to step 334.

At step 334, control proposes an updated navigational route that includes the EVSE charging location to the user, for example, on display 156, 184, 188. At step 338, control determines if the user has accepted the proposed route, for example, via navigation input 186. If no, control returns to step 322 to determine an alternate route. If the user accepts/selects the proposed route, control proceeds to step 340 and supervisory controller 108 displays the selected route (e.g., on nav display 184) and any additional information such as, for example, range, battery energy, and power usage/predictions through HMI display 188.

At step 342, control continuously updates the energy consumption prediction and metrics as the vehicle travels. This includes at step 344, storing new data to the vehicle historic energy usage and individual driver profile memory 158. At step 346, control determines if the vehicle has reached the destination or turned off the vehicle. If no, control returns to step 340. If yes, control ends.

Figure 4:
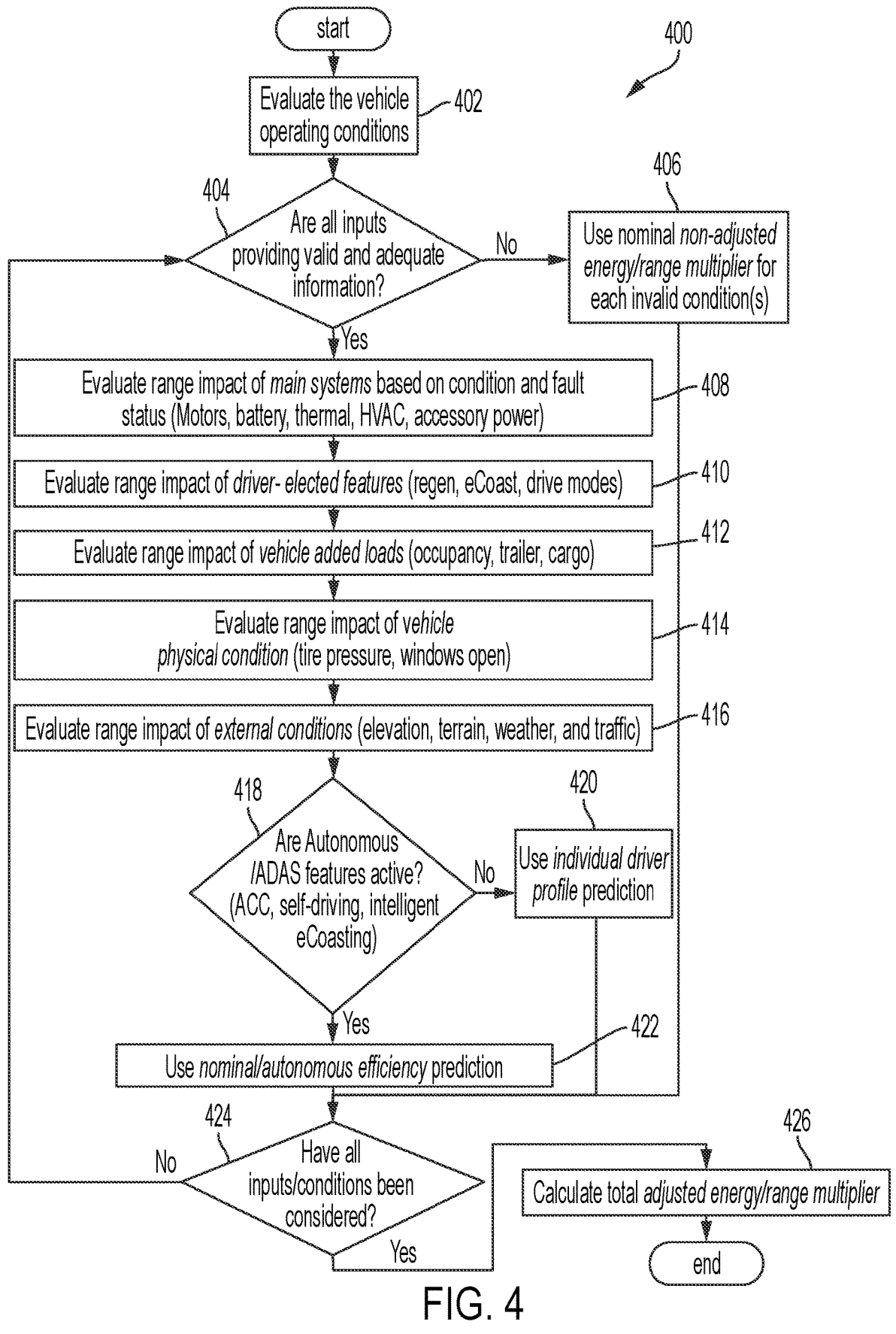
FIG. 4 is a flow diagram of an example method of determining a predicted intelligent energy consumption according to the principles of the present application.

Referring now to FIG. 4, a flow diagram of an example method 400 for determining an energy/range prediction according to the principles of the present application is illustrated. This includes determining the predicted intelligent energy consumption, nominal and actual (step 308). At step 402, supervisory controller 108 monitors and evaluates the vehicle operating conditions (step 302). At step 404, control determines if the one or more inputs are providing valid and adequate information (step 304). If no, at step 406, control selects a nominal non-adjusted energy/range multiplier for each invalid condition and proceeds to step 424. In one example, the nominal non-adjusted energy/range multiplier is calibrated from vehicle testing or based on vehicle/powertrain models/simulations.

If the one or more inputs are providing valid and adequate information, control proceeds to step 408 and supervisory controller 108 determines a first range impact of main systems based on condition and fault status. In other words, control determines how current operation of the main systems consumes power and reduces vehicle range. In the example embodiment, main systems include the motor(s) (EDM 128), thermal system 144, HVAC system (HVAC module 172), and accessory power (APM 166).

At step 410, control determines a second range impact of driver-selected features. In other words, control determines how operation of the current selection of the driver-selected features consumes power and reduces vehicle range. In one example, the driver-selected features include regen braking, e-coast, and drive modes (HMI input 190). At step 412, control determines a third range impact of vehicle added loads to determine how the current added loads consume power and reduce vehicle range. In the example embodiment, the vehicle added loads include vehicle occupancy, trailer, and cargo (BCM 176 and ORC 178). At step 414, control determines a fourth range impact of vehicle physical condition to determine how the current physical condition of the vehicle consumes power and reduces vehicle range. In the example embodiment, the vehicle physical condition includes tire pressure (BSM 174) and window open status (BCM 176).

At step 416, control determines a fifth range impact of external conditions to determine how the current vehicle external conditions affect vehicle power consumption and reduce vehicle range. In the example embodiment, the external conditions include elevation, terrain, weather, and traffic (e.g., from navigation display 184). At step 418, control determines if vehicle autonomous/ADAS features are active. Example features include autonomous, adaptive, or intelligent cruise control (ACC), self-driving, and intelligent e-coasting. If no, control proceeds to step 420 and selects an individual driver profile prediction (e.g., multiplier specific to historic data and driving habits of an individual) and proceeds to step 424. If yes, control proceeds to step 422.

At step 422, control selects a nominal/autonomous efficiency prediction (e.g., a multiplier specific to the efficiency model calculation, such as 'abide to speed signage', etc.). At step 424, control determines if all predetermined/pre-selected inputs/conditions have been considered. If no, control returns to step 404. If yes, at step 426, control determines a total energy/range multiplier, which is combined with the nominal autonomous efficiency prediction to yield the predicted intelligent energy consumption.

Described herein are system and methods for route optimization of a battery electric vehicle. The system provides real time calculation of the current range available and selection of route to reduce range anxiety using a wide variety of data available from the vehicle. The system more accurately predicts the vehicle's range at the start of a trip and maintains that accuracy throughout the drive by preemptively considering individual driving style, vehicle, or road conditions such as cargo/trailer load, occupancy, tire pressures, vehicle damage or faults, driver aggressiveness, driver speeds, and weather.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A route optimization system for a battery electric vehicle (BEV) having a high voltage battery, the route optimization system comprising:

a user interface configured to display information and to receive user input for a route selection of the BEV; and a controller programmed to:

receive, by a user via the user interface, a destination of travel for the BEV;

determine a navigational route to the destination of travel;

evaluate a set of vehicle operating conditions;

determine a predicted intelligent energy consumption of the BEV based on the set of vehicle operating conditions;

determine a trip estimated energy consumption based on the navigational route and the predicted intelligent energy consumption;

if the trip estimated energy consumption is greater than a remaining energy in the high voltage battery, determine an electric vehicle supply equipment (EVSE) charging location along the navigational route;

determine an updated trip estimated energy consumption that accounts for addition of the EVSE charging location to the navigational route; and propose, to the user, an updated navigational route including the EVSE charging location if the remaining energy in the high voltage battery is sufficient to account for the addition of the EVSE charging location to the navigational route, wherein determining the predicted intelligent energy consumption includes determining a first vehicle range impact based on:

(i) an electric drive motor (EDM) power consumption input;

(ii) a battery management system (BMS) state of charge (SOC) input, power consumption input, and high voltage battery energy level input;

(iii) a thermal management system thermal state input and thermal power consumption input;

(iv) a heating, ventilation, and air conditioning (HVAC) system power consumption input; and (v) an accessory power module (APM) power consumption input.

2. The route optimization system of claim 1, wherein determining the predicted intelligent energy consumption further includes determining a second vehicle range impact based on:

(i) a driver selected regenerative braking mode input; and (ii) a driver selected drive mode input.

3. The route optimization system of claim 2, wherein determining the predicted intelligent energy consumption further includes determining a third vehicle range impact based on:

(i) an occupant restraint controller (ORC) occupancy sensing input and cargo sensing input; and (ii) a trailer sensing input.

4. The route optimization system of claim 3, wherein determining the predicted intelligent energy consumption further includes determining a fourth vehicle range impact based on:

(i) a tire pressure input; and (ii) a window state input indicating if a window is open or closed.

5. The route optimization system of claim 4, wherein determining the predicted intelligent energy consumption further includes determining a fifth vehicle range impact based on:

(i) an elevation of the BEV vehicle input;

(ii) a terrain input;

(iii) a weather conditions input; and (iv) a traffic input.

6. The route optimization system of claim 1, wherein the set of vehicle operating conditions includes the following inputs: (a) a current state of charge (SOC) of the high voltage battery, (b) a current power consumption of the high voltage battery, (c) a remaining energy of the high voltage battery, (d) a thermal management system status and power consumption, (e) an onboard diagnostic (OBD) system operation, (f) a trailer status, (g) a vehicle load and/or cargo weight estimation, (h) a vehicle occupancy status, (i) a tire pressure, (j) a distance to the destination of travel, (k) a time to the destination of travel, (l) speed limits along the navigational route, (m) traffic information along the navigational route, (n) EVSE location, (o) EVSE power type, (p) EVSE operational availability, (q) EVSE plug-type, (r) a maximum high voltage battery charge selection, (s) weather conditions, (t) selected vehicle drive mode, (u) selected regenerative braking mode, (v) vehicle speed, (w) a vehicle historic energy usage from memory, and (x) an individual driver habits profile.

7. The route optimization system of claim 1, wherein determining the predicted intelligent energy consumption comprises:

determining a nominal predicted intelligent energy consumption; and determining an actual predicted intelligent energy consumption.

8. The route optimization system of claim 7, wherein the controller is further programmed to:

compare the actual and nominal predicted intelligent energy consumption; and if the actual predicted intelligent energy consumption is higher than the nominal predicted intelligent energy consumption, inform the user of a higher than expected energy consumption, thereby indicating an issue with the vehicle and/or user driving habits.

9. A route optimization system for a battery electric vehicle (BEV) having a high voltage battery, the route optimization system comprising:

a user interface configured to display information and to receive user input for a route selection of the BEV; and a controller programmed to:

receive, by a user via the user interface, a destination of travel for the BEV;

determine a navigational route to the destination of travel;

evaluate a set of vehicle operating conditions;

determine a predicted intelligent energy consumption of the BEV based on the set of vehicle operating conditions;

determine a trip estimated energy consumption based on the navigational route and the predicted intelligent energy consumption;

determine a simple rolling average energy consumption;

determine if the predicted intelligent energy consumption is within a predetermined threshold of the simple rolling average energy consumption;

if within the predetermined threshold, determine the trip estimated energy consumption based on the navigational route and the simple rolling average energy consumption;

if outside the predetermined threshold, determine the trip estimated energy consumption based on the navigational route and the predicted intelligent energy consumption;

if the trip estimated energy consumption is greater than a remaining energy in the high voltage battery, determine an electric vehicle supply equipment (EVSE) charging location along the navigational route;

determine an updated trip estimated energy consumption that accounts for addition of the EVSE charging location to the navigational route; and propose, to the user, an updated navigational route including the EVSE charging location if the remaining energy in the high voltage battery is sufficient to account for the addition of the EVSE charging location to the navigational route.

10. A route optimization method for a battery electric vehicle (BEV) having a high voltage battery, the method comprising:

receiving, by a controller and a user interface, a destination of travel for the BEV;

determining, by the controller, a navigational route to the destination of travel;

evaluating, by the controller, a set of vehicle operating conditions;

determining, by the controller, a predicted intelligent energy consumption of the BEV based on the set of vehicle operating conditions;

determining, by the controller, a trip estimated energy consumption based on the navigational route and the predicted intelligent energy consumption;

if the trip estimated energy consumption is greater than a remaining energy in the high voltage battery, determining by the controller, an electric vehicle supply equipment (EVSE) charging location along the navigational route;

determining, by the controller, an updated trip estimated energy consumption that accounts for addition of the EVSE charging location to the navigational route; and proposing to the user, by the controller, an updated navigational route including the EVSE charging location if the remaining energy in the high voltage battery is sufficient to account for the addition of the EVSE charging location to the navigational route, wherein determining the predicted intelligent energy consumption includes determining, by the controller, a first vehicle range impact based on:

(i) an electric drive motor (EDM) power consumption input;

(ii) a battery management system (BMS) state of charge (SOC) input, power consumption input, and high voltage battery energy level input;

(iii) a thermal management system thermal state input and thermal power consumption input;

(iv) a heating, ventilation, and air conditioning (HVAC) system power consumption input; and (v) an accessory power module (APM) power consumption input.

11. The method of claim 10, wherein determining the predicted intelligent energy consumption further includes determining, by the controller, a second vehicle range impact based on:

(i) a driver selected regenerative braking mode input; and (ii) a driver selected drive mode input.

12. The method of claim 11, wherein determining the predicted intelligent energy consumption further includes determining, by the controller, a third vehicle range impact based on:

(i) an occupant restraint controller (ORC) occupancy sensing input and cargo sensing input; and (ii) a trailer sensing input.

13. The method of claim 12, wherein determining the predicted intelligent energy consumption further includes determining a fourth vehicle range impact based on:

(i) a tire pressure input; and (ii) a window state input indicating if a window is open or closed.

14. The method of claim 13, wherein determining the predicted intelligent energy consumption further includes determining, by the controller, a fifth vehicle range impact based on:

(i) an elevation of the BEV vehicle input;

(ii) a terrain input;

(iii) a weather conditions input; and (iv) a traffic input.

15. The method of claim 10, wherein the set of vehicle operating conditions includes the following inputs: (a) a current state of charge (SOC) of the high voltage battery, (b) a current power consumption of the high voltage battery, (c) a remaining energy of the high voltage battery, (d) a thermal management system status and power consumption, (e) an onboard diagnostic (OBD) system operation, (f) a trailer status, (g) a vehicle load and/or cargo weight estimation, (h) a vehicle occupancy status, (i) a tire pressure, (j) a distance to the destination of travel, (k) a time to the destination of travel, (l) speed limits along the navigational route, (m) traffic information along the navigational route, (n) EVSE location, (o) EVSE power type, (p) EVSE operational availability, (q) EVSE plug-type, (r) a maximum high voltage battery charge selection, (s) weather conditions, (t) selected vehicle drive mode, (u) selected regenerative braking mode, (v) vehicle speed, (w) a vehicle historic energy usage from memory, and (x) an individual driver habits profile.

16. The method of claim 10, wherein determining the predicted intelligent energy consumption comprises:

determining, by the controller, a nominal predicted intelligent energy consumption; and determining, by the controller, an actual predicted intelligent energy consumption.

17. The method of claim 16, further comprising:

comparing, by the controller, the actual and nominal predicted intelligent energy consumption; and if the actual predicted intelligent energy consumption is higher than the nominal predicted intelligent energy consumption, informing the user, by the controller, of a higher than expected energy consumption, thereby indicating an issue with the vehicle and/or user driving habits.

18. The method of claim 10, further comprising:

determining, by the controller, a simple rolling average energy consumption;

determining, by the controller, if the predicted intelligent energy consumption is within a predetermined threshold of the simple rolling average energy consumption;

if within the predetermined threshold, determining by the controller, the trip estimated energy consumption based on the navigational route and the simple rolling average energy consumption; and if outside the predetermined threshold, determining by the controller, the trip estimated energy consumption based on the navigational route and the predicted intelligent energy consumption.

* * * * *